United States Patent [19]
Favstritsky et al.

[11] Patent Number: 5,100,986
[45] Date of Patent: Mar. 31, 1992

[54] FLAME RETARDANT BROMINATED STYRENE-BASED COATINGS

[75] Inventors: Nicolai A. Favstritsky, W. Lafayette; Jin-liang Wang, Lafayette; Richard S. Rose, W. Lafayette, all of Ind.

[73] Assignee: Great Lakes Chemical Corporation, West Lafayette, Ind.

[21] Appl. No.: 606,590

[22] Filed: Oct. 31, 1990

Related U.S. Application Data

[63] Continuation-in-part of Ser. No. 541,057, Jun. 20, 1990.

[51] Int. Cl.$^5$ .............................. C08F 12/16
[52] U.S. Cl. .................. 526/293; 526/292.7; 526/294; 526/299; 526/329.1; 526/329.2; 570/193; 585/435
[58] Field of Search ............ 526/293, 294, 299; 570/193; 585/435

[56] References Cited

U.S. PATENT DOCUMENTS

| | | | |
|---|---|---|---|
| 3,025,277 | 3/1962 | Sterling | 526/293 |
| 3,497,484 | 2/1970 | Halasa | 526/293 |
| 4,151,223 | 4/1979 | Neuberg | 526/293 |
| 4,292,453 | 9/1981 | Daren | 570/193 |
| 4,412,051 | 10/1983 | deMan | 526/293 |

FOREIGN PATENT DOCUMENTS

| | | |
|---|---|---|
| 907229 | 8/1972 | Canada . |
| 2164051A | 3/1986 | United Kingdom . |

OTHER PUBLICATIONS

"New Epoxy Resins Based on Bromostyrene-Butadiene Cotelomers", *Polymer Prep.*, V.27(2), pp. 399-400 (1986).

*Primary Examiner*—Joseph L. Schofer
*Assistant Examiner*—Fred Zitomer
*Attorney, Agent, or Firm*—Woodard, Emhardt, Naughton, Moriarty & McNett

[57] ABSTRACT

Halogenated styrene-based coatings having surprisingly good physical properties in combination with flame retardancy are prepared from copolymers of ring-halogenated, ethylenically unsaturated aromatic monomers and aliphatic conjugated dienes having from 4 to 10 carbon atoms, and from terpolymers of ring-halogenated, ethylenically unsaturated aromatic monomers, halogen-free aromatic monomers, and aliphatic conjugated dienes having from 4 to 10 carbon atoms.

27 Claims, No Drawings

FLAME RETARDANT BROMINATED STYRENE-BASED COATINGS

REFERENCE TO RELATED APPLICATIONS

This application is a continuation-in-part of United States patent application Ser. No. 541,057, filed on Jun. 20, 1990, and entitled Flame Retardant Brominated Styrene-Based Polymers.

BACKGROUND OF THE INVENTION

1. Field of the Invention

This invention relates to flame retardant latex coatings, and particularly to coatings prepared from compositions such as dibromostyrene-butadiene and dibromostyrene-styrene-butadiene latices.

2. Description of the Prior Art

Styrene based copolymers and terpolymers have found many applications in the prior art. Styrene-butadiene rubbers (SBR) containing low styrene proportions (15%-35%) have been used for many applications, including tires, retreading, belting, footwear, wire and cable coating, sponge rubber, pressure-sensitive tape, reinforcement plastics and easy-processing polymers. Styrene-butadiene resins containing high percentages of styrene (60%-83%) have been used as reinforcing resins and coating resins. Styrene-butadiene latices containing varying amounts of styrene (15%-65%) have been used in fabric-to-rubber adhesives, foamed carpet backing, textile adhesives and carpet laminating. Crosslinked and non-crosslinked SBR polymers composed of 5%-43% styrene have been used as adhesives and sealants.

Although such styrene based compounds have had wide usage, there has remained a need to prepare styrene polymers having better flame retardant properties. The usual method by which flame-retarding properties are imparted to plastics is the blending-in of flame retardants. Many of the commonly used flame retardants contain bromine, for example brominated diphenyl or diphenyloxide compounds, together with antimony trioxide. These flame retardants impart good flame-retarding properties when included in the plastics mixture by blending.

However, these flame retardants have a major disadvantage in that the processing of plastics incorporating brominated flame retardants can give rise to problems. For example, the flame retardant or decomposition products thereof may be released during processing. This can cause an offensive odor, and in certain cases noxious compounds may be released. In addition, these flame retardants may significantly affect the mechanical properties of the plastics in which they are contained.

Many proposals have been made to overcome such difficulties. A number of proposals simply amount to the replacement of the brominated compounds with compounds containing nitrogen and/or phosphorus, which compounds are similarly blended into the plastic. Although these compounds may present fewer problems in processing than the bromine-containing flame retardants, for the most part they also have the disadvantage of adversely influencing the mechanical properties of the plastics.

Nae, "New Epoxy Resins Based on Bromostyrene-Butadiene Cotelomers", Polymer Prep., V.27(2), p. 399–400 (1986), described the synthesis of a limited class of epoxy resins based on the preparation of cotelomers which were subsequently epoxidized. Hydrogen peroxide was used as both the initiator and the telogen for the reaction of bromostyrene (mono, di and tri) with 1,3-butadiene to yield cotelomers having terminal—OH groups. The cotelomers were semi-liquids or solids, with molecular weights ranging from 1,000 to 14,000. These random oligomers were then epoxidized to produce epoxy resins useful as a matrix for composite materials. In U.K. Patent Application GB 2,164,051A published on Mar. 12, 1986, Nae, et al. claimed the same OH-terminated cotelomers having molecular weights of 600 to about 14,000. These cotelomers were described as being useful components of flame retardant polymers, especially polyurethanes.

In Canadian Patent No. 907,229, issued on Aug. 8, 1972, Mackay described a latex of a carboxylic acid based polymer. In addition to an $\alpha,\beta$-ethylenically unsaturated carboxylic acid monomer or a compound hydrolyzable to such a carboxylic acid monomer, the polymers comprised a ring-halogenated ethylenically unsaturated aromatic monomer (e.g., monochlorostyrene) and an aliphatic conjugated diene (e.g., butadiene). Mackay indicated that the practice of his invention in preparing fire-resistant latex foam required a carboxylic acid, a melamine-formaldehyde resin, antimony trioxide and a filler comprising an amphoteric metal oxide hydrate. Neither a copolymer of the class of dibromostyrene-butadiene, nor a terpolymer such as dibromostyrene-styrene-butadiene was discussed. Mackay did disclose that a small amount of styrene could be used along with the above prescribed monomers in the copolymer, and indicated in one example that 2,4-dibromostyrene as a monomer was used to prepare a carboxylic latex containing acrylic acid, dibromostyrene and 1,3-butadiene.

SUMMARY OF THE INVENTION

In accordance with the present invention, there are provided flame retardant copolymer coatings comprising ring-halogenated, ethylenically unsaturated aromatic monomers and aliphatic conjugated dienes having from 4 to 10 carbon atoms. Copolymer coatings according to the present invention include compositions represented by the formula:

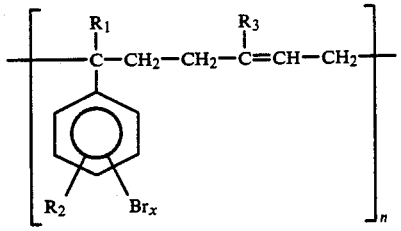

in which n is an integer; $R_1$ is H or $CH_3$; $R_2$ is H or a $C_{1-4}$ lower alkyl group; $R_3$ is H, Cl or $CH_3$; and x=1 to 4.

In a further aspect of the present invention, there are provided terpolymer coatings of (a) ring-halogenated, ethylenically unsaturated aromatic monomers, (b) halogen-free aromatic monomers, and (c) aliphatic conjugated dienes having from 4 to 10 carbon atoms. Terpolymers according to the present invention include compositions represented by the formula:

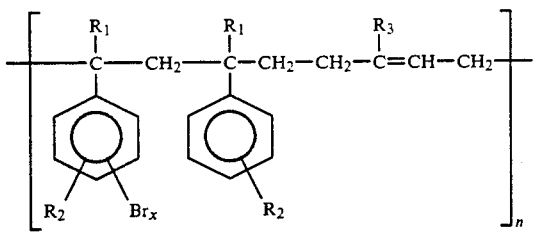

in which n is an integer; $R_1$ is H or $CH_3$; $R_2$ is H or a $C_{1-4}$ lower alkyl group; $R_3$ is H, Cl or $CH_3$; and $x = 1$ to 4.

The copolymer and terpolymer coatings of the present invention have a molecular weight of at least about 25,000. Preferably, the molecular weight is at least about 100,000.

It is an object of the present invention to provide coatings based on halogenated, styrene-based polymers, which coatings have desirable physical properties in combination with increased flame retardancy.

A further object of the present invention is to provide coatings utilizing ring-halogenated aromatic monomers in partial or total substitution for non-halogenated aromatic monomers used in prior art compositions.

Further objects and advantages of the present invention will be apparent from the description which follows.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

The present invention provides styrene based coatings having improved flame retardancy. The partial or total replacement of styrene with brominated styrene in styrene-butadiene rubbers, styrene-butadiene resins and styrene-butadiene latices imparts fire retardancy and solvent, chemical and oil resistance not previously available. The brominated aromatic monomers may generally be included in a variety of latex coatings, including but not limited to those in which non-brominated aromatic monomers have been known to be useful. The brominated monomers may be used in partial or total replacement of such non-brominated monomers. It is an aspect of the present invention that the described ring-brominated aromatic monomers may be used in the wide-ranging prior art coatings in which non-brominated aromatic monomers have been employed, with the consequent advantage being the achievement of improved flame retardancy without detrimental impact on the physical properties of the latex.

Proper selection of monomers used in conjunction with the brominated aromatic monomer enables production of flame retardant coatings useful in a wide range of applications. As used herein, the term "coatings" is used in a broad sense and is intended to include applications to a substrate both as a laminate or as an interstitial filler. For example, included are uses as textile backcoatings for woven upholstery and draperies, carpet backing, non-woven filter media binders, paints, adhesives, caulks, sealants and the like, applied to the variety of suitable substrates.

In accordance with one embodiment of the present invention, there are provided flame retardant copolymer coatings comprising units from ring-halogenated, ethylenically unsaturated aromatic monomers and units from aliphatic conjugated dienes having from 4 to 10 carbon atoms. In a second embodiment there are provided flame retardant terpolymer coatings comprising units from ring-halogenated, ethylenically unsaturated aromatic monomers, units from halogen-free aromatic monomers, and units from aliphatic conjugated dienes having from 4 to 10 carbon atoms.

The ring-halogenated monomers of both the copolymer and terpolymer coatings include mono-, di-, tri- and tetrabromo- forms of styrene, methylstyrene, α-methylstyrene, α-methyl methylstyrene, ethylstyrene or α-methyl ethylstyrene. Mixtures or mixed isomers of the above monomers may also be used. The preferred monomer is polybrominated styrene, with dibromostyrene being most preferred. As produced by Great Lakes Chemical Corporation, dibromostyrene normally contains about 15 percent monobromostyrene and 3 percent tribromostyrene by weight.

The ring halogen may be either chlorine or bromine, and is preferably bromine. In the preferred embodiments for the copolymer and terpolymer coatings of the present invention, the ring-halogenated aromatic monomers are included in an amount to provide between about 10 and about 60 percent of bromine by weight based on the total weight of the coating.

The conjugated diene monomers for both the copolymers and terpolymers preferably have from 4 to 10 carbon atoms, and may be of the type used in related prior art compositions. Representative of the conjugated diene monomers are 1,3-butadiene, isoprene, 2,3-dimethyl-1,3-butadiene, chloroprene, piperylene and other hydrocarbon homologs of 1,3-butadiene. The preferred monomer is butadiene, chloroprene or isoprene, particularly butadiene.

According to the first embodiment, there are provided copolymer coatings of the ring-halogenated aromatic monomers and the conjugated diene monomers. For such copolymers, the ring-halogenated aromatic monomer is used in an amount to provide from about 95 to about 5 percent by weight of the monomer based on total weight of the copolymer. The preferred amount of ring-halogenated aromatic monomer is about 88 to about 25 percent by weight. Also for the copolymer coatings, the conjugated diene is used is an amount to provide from about 5 to about 95 percent by weight, preferably from about 12 to about 75 percent by weight, of the conjugated diene monomer based on total weight of the coating.

Copolymer coatings according to the present invention include compositions represented by the formula:

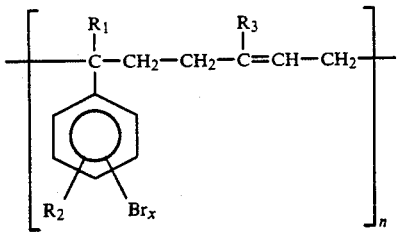

in which n is an integer; $R_1$ is H or $CH_3$; $R_2$ is H or a $C_{1-4}$ lower alkyl group; $R_3$ is H, Cl or $CH_3$; and $x=1$ to 4.

According to the second embodiment of the present invention, there are provided terpolymer coatings of halogen-free aromatic monomers as well as the ring-halogenated aromatic monomers and the conjugated diene monomers. Representative halogen-free aromatic monomers are styrene, α-methylstyrene, methylstyrene, α-methyl methylstyrene, ethylstyrene and α-methyl ethylstyrene. The preferred halogen-free aromatic monomer is styrene or α-methylstyrene.

For such terpolymer coatings, the ring-halogenated aromatic monomer is used is an amount to provide from about 90 to about 5 percent by weight of the monomer based on total weight of the coating. The preferred amount of ring-halogenated aromatic monomer is about 40 to about 20 percent by weight. The halogen-free aromatic monomer comprises about 5 to about 95 weight percent, preferably about 10 to about 68 weight percent, based on total weight of the coating. Also for the terpolymer coatings, the conjugated diene is used in an amount to provide from about 90 to about 5 percent by weight, preferably from about 50 to about 12 percent by weight, of the aliphatic conjugated diene monomer based on total weight of the coating.

Terpolymer coatings according to the present invention include compositions represented by the formula:

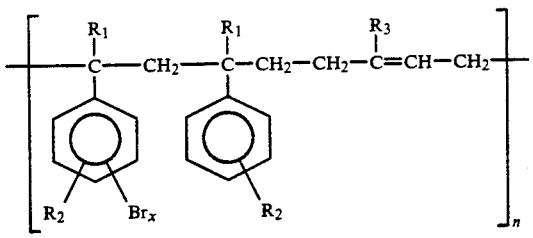

in which n is an integer; $R_1$ is H or $CH_3$; $R_2$ is H or a $C_{1-4}$ lower alkyl group; $R_3$ is H, Cl or $CH_3$; and $x=1$ to 4.

The copolymer and terpolymer coatings of the present invention have a molecular weight of at least about 25,000. Preferably, the molecular weight is at least about 100,000.

Techniques for preparation of the copolymer and terpolymer latices used to produce the inventive coatings include solution, bulk, emulsion and suspension polymerization. Suitable initiators include the initiators used for free radical polymerization such as organic peroxides, hydroperoxides, azo or diazo compounds, persulfates, redox systems, etc. Useful emulsifiers include anionic, cationic, nonionic or amphoteric. Chain transfer agents include aliphatic, aryl mercaptans and disulfides, $CCl_4$, $CBr_4$, $CHI_3$ and $CHCl_3$, etc. Among these, mercaptans are preferred.

Polymerization may be carried out in the presence of air. Faster reactions are observed in the absence of oxygen at temperatures ranging from $-30°$ to $110°$ C., with preferred temperatures ranging from about $0°$ C. to about $60°$ C.

Polymerization may be terminated short of completion to yield products having selected molecular weights. For example, termination at 45%–75% conversion generally yields product which is non-crosslinked latex and its coagulated polymer. Termination at 75%–100% conversion generally produces product comprising crosslinked latex and its coagulated polymer.

The latices and the resultant coatings can be stabilized by incorporation of 0.5 to 4 parts antioxidant per 100 parts polymer, preferably 1 to 2 parts antioxidant. Suitable antioxidants include alkylated-arylated bisphenolic phosphite, tris(nonylphenyl)phosphite, styrenated phenol, bis-(alkylthiopropionate)diesters, diaryl-p-phenylenediamines, mixed styrenated diphenylamines (Wingstay 29 from Goodyear, Akron, Ohio) and butylated reaction product of p-cresol and dicyclopentadiene, (Vanox L from Goodyear, Akron, Ohio).

The flame retardant latices used in the present invention may be admixed with other latex compositions, including non-flame retardant latices, to provide coatings having enhanced properties. In particular, the combination of the flame retardant latices used herein with other latices will yield coatings having improved flame retardancy. The latices of the present invention may then be provided with sufficient levels of bromine to yield the desired levels, such as previously indicated, for the resulting combined latices and coatings. Improvement in properties may also be achieved for coatings from such mixtures with respect to such aspects as adhesion, film forming, chemical resistance and flexibility.

The invention will be further described with reference to the following specific Examples. However, it will be understood that these Examples are illustrative and not restrictive in nature. In the following Examples, percents indicated are percents by weight unless indicated otherwise.

EXAMPLES 1–8

Preparation of Copolymers at High Conversion

A soap solution (a mixture of 180 parts deionized water, 5 parts sodium dodecyl sulfate, 0.3 parts potassium persulfate, and 0.3 parts sodium bisulfite) was prepared and charged into a 32 oz. bottle. To the bottle, a mixture of 20–88 parts dibromostyrene and 0.175 parts n-dodecyl mercaptan was charged. The bottle (with cap) was weighed on a balance, and 12–80 parts butadiene added slowly until an excess (1 to 2 parts) was present. The cap was then placed loosely on the neck of the bottle, and the butadiene was allowed to evaporate until the correct weight was established. The cap was sealed with rubber and TEFLON gaskets and was then tightened quickly by hand using rubber gloves. The bottle was placed in a clamp in a 50° C. water bath and rotated. The reaction was allowed to run for a certain period of time (2 to 20.75 hr), after which the bottle was removed from the water bath and placed in ice-water for 10 minutes.

The chilled bottle was then tested for pressure by inserting a needle through the cap. When no pressure was apparent, the bottle was opened and the contents dripped into a 6% aqueous MgSO$_4$ solution under stirring, followed by coagulation of this mixture by dripping into rapidly stirred methanol. The coagulated polymer was filtered, air-dried, frozen, ground and dried in a vacuum oven at 25°–110° C. to a constant weight. The polymers were insoluble in tetrahydrofuran, chloroform and toluene. Bromine content (% Br) of the polymer was measured by Schöniger Combustion Method and weight loss (% loss) measured at a rate of 20° C./min. by Thermogravimetric Analysis (TGA). Results for the polymers are tabulated in Table I.

EXAMPLE 11

Scale-Up of Copolymer Preparation

A 2 l Parr reactor was charged with a soap solution of 1014 g of deionized water, 28 g sodium dodecyl sulfate, 1.87 g sodium bicarbonate, 1.87 g potassium persulfate and 1.87 g sodium bisulfite. To this reactor containing soap solution was added a mixture of 420 g dibromostyrene and 0.98 g n-dodecyl mercaptan, followed by the addition of 140 g butadiene. The contents of the reactor were allowed to react for one and a half hours to 30 percent solids; the temperature was gradually allowed to increase from room temperature to 90° C. The reactor was cooled to room temperature, and the copolymer

TABLE I

| | | | Preparation of Copolymers at High Conversion | | | | | | | | |
|---|---|---|---|---|---|---|---|---|---|---|---|
| | | | Monomer[1] | | Polymer[2] | | | | | | |
| | Reaction | Conversion | Charge | BR | Composition | | | TGA, Loss at °C. | | | |
| Ex. | Time/hr | % | M:B | % | M:B | 5% | 10% | 25% | 50% | 75% | 95% |
| 1 | 2 | 96 | 88:12 | 49.5 | 83:17 | 338 | 366 | 390 | 416 | 441 | 472 |
| 2 | 2.5 | 97 | 75:25 | 44.1 | 74:26 | 378 | 388 | 408 | 435 | 460 | 492 |
| 3 | 3 | 86 | 67:33 | 40.5 | 67:33 | 377 | 388 | 411 | 441 | 465 | 488 |
| 4 | 5.25 | 93 | 60:40 | 35.3 | 59:41 | 369 | 384 | 418 | 453 | 474 | 683 |
| 5 | 14.42 | 97 | 50:50 | 28.2 | 47:53 | 379 | 394 | 424 | 457 | 478 | 504 |
| 6 | 14.42 | 98 | 40:60 | 20.9 | 35:65 | 381 | 396 | 430 | 457 | 479 | 699 |
| 7 | 20.75 | 94 | 25:75 | 15.2 | 25:75 | 392 | 419 | 440 | 461 | 478 | 596 |
| 8 | 20.25 | 92 | 20:80 | 11.3 | 19:81 | 388 | 402 | 446 | 474 | 491 | 513 |

[1]M = dibromostyrene; B = butadiene
[2]Based on % Br.

EXAMPLES 9 AND 10

Preparation of Copolymers at Low Conversion

The general procedure of Examples 1–8 was repeated here except that the polymerization reaction was allowed to reach 71%–74% conversion at 27%–28% solids in 3.33–3.5 hr. at 50° C. These latices were shortstopped with 3 parts deionized water and 0.18 parts 50% H$_2$O$_2$ and antioxidized with 1 part Vanox L (butylated reaction product of p-cresol and dicyclopentadiene from Goodyear, Akron, Ohio) before the coagulation. These polymers were soluble in tetrahydrofuran and had an average molecular weight of 135,000 based on a standard molecular weight (MW) of polystyrene (PS) by GPC. Results of the preparation are tabulated in Table II below.

was recovered by dripping into 6 percent aqueous MgSO$_4$ solution and then coagulated in methanol under rapid stirring. The coagulated polymer was filtered, air-dried, frozen, round and dried in a 50° C. vacuum oven to constant weight. The polymer weighed 482 g (86% yield) and was soluble in tetrahydrofuran, chloroform and tolene. The result of the preparation is tabulated in Table III.

TABLE III

| | | | Scale-Up of Copolymer Preparation | | | | | | | | |
|---|---|---|---|---|---|---|---|---|---|---|---|
| | | | Monomer[1] | | Polymer[2] | | | | | | |
| | Reaction | Conversion | Charge | BR | Composition | | | TGA, Loss at °C. | | | |
| Ex. | Time/hr | % | M:B | % | M:B | 5% | 10% | 25% | 50% | 75% | 95% |
| 11 | 1.5 | 80 | 75:25 | 45.45 | 76:24 | 368 | 380 | 404 | 433 | 457 | 479 |

[1]M = dibromostyrene; B = butadiene
[2]Based on % Br.

EXAMPLES 12–14

Preparation of Terpolymers at High Conversion

The general procedure of Examples 1–8 was repeated here to prepare terpolymers which contained 40–20 percent by weight of dibromostyrene, 19–68 percent by weight of styrene and 40–13 percent by weight of butadiene. The reaction reached 94 percent conversion at 35 percent solids at 50° C. in 4.25 to 14.33 hr. as shown in Table IV. In Example 12, a terpolymer of 19/68/13 was

TABLE II

| | | | Preparation of Copolymers at Low Conversion | | | | | | | | | |
|---|---|---|---|---|---|---|---|---|---|---|---|---|
| | | | Monomer[1] | | Polymer[2] | | | | | | | |
| | Reaction | Conversion | Charge | BR | Composition | MW | | | TGA, Loss at °C. | | | |
| Ex. | Time/hr | % | M:B | % | M:B | (ps) | 5% | 10% | 25% | 50% | 75% | 95% |
| 9 | 3.5 | 74 | 60:40 | 40.25 | 67:33 | 122,000 | 386 | 398 | 417 | 447 | 472 | 499 |
| 10 | 3.33 | 71 | 57:43 | 37.89 | 63:37 | 148,000 | 380 | 395 | 415 | 445 | 469 | 560 |

[1]M = dibromostyrene; B = butadiene
[2]Based on % Br.

soluble in tetrahydrofuran, chloroform and toluene and had an average molecular weight of 165,000 relative to polystyrene by GPC, whereas terpolymers of 40/20/40 and 35/25/40 were insoluble.

TABLE IV

Preparation of Terpolymers at High Conversion

| Ex. | Reaction Time/hr | Conversion % | Monomer[1] Charge M:S:B | BR % | Polymer[2] Composition M:S:B | MW (ps) | TGA, Loss at °C. | | | | | |
|---|---|---|---|---|---|---|---|---|---|---|---|---|
| | | | | | | | 5% | 10% | 25% | 50% | 75% | 95% |
| 12 | 4.25 | 94 | 20:68:12 | 11.50 | 19:68:13 | 165,000 | 350 | 378 | 400 | 418 | 438 | 699 |
| 13 | 14.33 | 94 | 40:20:40 | 23.58 | — | — | 384 | 495 | 417 | 448 | 474 | 512 |
| 14 | 14.33 | 93 | 35:25:40 | 19.37 | — | — | 385 | 397 | 418 | 449 | 475 | 699 |

[1]M = dibromostyrene; S = styrene; B = butadiene
[2]Calculated composition based on % Br and $^1$H NMR integration

EXAMPLE 15

Scale-Up of Terpolymers at High Conversion

The general procedure of Example 11 was repeated here to prepare a terpolymer which contained 19 weight percent of dibromostyrene, 67 weight percent of styrene and 14 weight percent of butadiene. The monomers were polymerized to approximately 100 percent conversion at 37 percent solids in 2.5 hr, and the temperature was gradually increased from room temperature to 65° C. The coagulated terpolymer was soluble in tetrahydrofuran, chloroform and toluene and had an average molecular weight of 119,000 relative to polystyrene. The result of the preparation is tabulated in Table V.

EXAMPLE 20

The foregoing latex compositions are applied as coatings for a variety of substrates. Suitable coatings with increased flame retardancy are obtained. The preparation of related latex compositions as described previously also yields equally advantageous products. For example, in place of dibromostyrene there is used a variety of ethylenically-unsaturated, ring-brominated aromatic monomers such as methylstyrene, α-methylstyrene, α-methyl methylstyrene, ethylstyrene and α-methyl ethylstyrene (with mono, di, tri and tetra bromine substitution in the benzene ring). The latices yield coatings which have improved flame retardancy and good physical properties and are useful in a variety of coating applications. Similarly, superior flame retardant latex compositions are obtained by preparations according to the earlier Examples with the use of alternate monomers as described previously in the text. The

TABLE V

Scale-Up of Terpolymer at High Conversion

| Ex. | Reaction Time/hr | Conversion % | Monomer[1] Charge M:S:B | BR % | Polymer[2] Composition M:S:B | MW (ps) | TGA, Loss at °C. | | | | | |
|---|---|---|---|---|---|---|---|---|---|---|---|---|
| | | | | | | | 5% | 10% | 25% | 50% | 75% | 95% |
| 15 | 2.5 | 97 | 20:68:12 | 11.40 | 19:67:14 | 119,000 | 359 | 378 | 399 | 417 | 436 | 472 |

[1]M = dibromostyrene; S = styrene; B = butadiene
[2]Calculated composition based on % Br and $^1$H NMR integration

EXAMPLES 16-19

Preparation of Terpolymers at Low Conversion

Preparation of 35-40/20-25/40 terpolymers at low conversion (47-64 percent) was carried out in a 32 oz. bottle by the same technique as described in Examples 1-8 except that these monomers were polymerized to approximately 47-64 percent conversion at 18-25 percent solids in 3.5 hr. 12 min. at 50° C. These latices were shortstopped with 3 parts deionized water and 0.18 parts 50 percent H₂O₂ and antioxidized with 1 part Vanox L before the coagulation. The coagulated products were dissolved in tetrahydrofuran, chloroform and toluene and had a molecular weight of 134,000 to 194,000 relative to polystyrene. Results of the preparation are tabulated in Table VI.

choice of monomers is primarily dependent on the physical properties desired for the resulting latices, and the presence of the ring-brominated aromatic monomer units provides increased flame retardancy for the resultant coatings.

EXAMPLE 21

Textile Backcoating

In a pressure bottle, 5 parts by weight sodium dodecyl sulfate, 0.3 parts potassium persulfate, and 0.3 parts sodium bisulfite were dissolved in 180 parts deionized water. Forty (40) parts dibromostyrene, 20 parts styrene and 0.18 parts n-dodecyl mercaptan were added. Finally, 40 parts butadiene was added and the bottle was sealed. After rotating about a horizontal axis in a 50° C.

TABLE VI

Preparation of Terpolymers at Low Conversion

| Ex. | Reaction Time/hr | Conversion % | Monomer[1] Charge M:S:B | BR % | Polymer[2] Composition M:S:B | MW (ps) | TGA, Loss at °C. | | | | | |
|---|---|---|---|---|---|---|---|---|---|---|---|---|
| | | | | | | | 5% | 10% | 25% | 50% | 75% | 95% |
| 16 | 3.5 | 58 | 40:20:40 | 27.89 | 46:21:32 | 144,000 | 385 | 394 | 414 | 441 | 469 | 496 |
| 17 | 4.2 | 64 | 40:20:40 | 28.29 | 47:16:37 | 194,000 | 378 | 394 | 413 | 443 | 468 | 496 |
| 18 | 3.5 | 47 | 35:25:40 | 24.85 | 41:31:27 | 134,000 | 377 | 389 | 409 | 435 | 460 | 490 |
| 19 | 4.2 | 61 | 35:25:40 | 25.97 | 43:19:38 | 161,000 | 381 | 394 | 414 | 444 | 470 | 496 |

[1]M = dibromostyrene; S = styrene; B = butadiene
[2]Calculated composition based on % Br and $^1$H NMR integration water bath for 14 hours, the contents of the bottle were recovered.

The reaction mixture was coated on one side of a 6 oz/yd² 100% polyester fabric. After drying for 45 minutes at 105° C., the pickup measured 2.5 oz/yd². The backcoated fabric was tested for flammability by MVSS-302. The average burn distance was less than one inch, meaning an SE (best) rating.

EXAMPLE 22

Textile Backcoating

The latex preparation described in Examples 21 was used to prepare a latex containing 30% by weight of monomer dibromostyrene, 40% by weight styrene, and 30% by weight of butadiene.

The resulting latex was allowed to cool and applied to the back of an 8 oz/yd² 100% polyester velvet with a lab coating device. Total add-on after drying was 1.2 oz/yd². The resulting coating was firm, yet flexible. When tested by the MVSS-302 flammability test, the backcoated fabric obtained an SE (best) rating with a total burn distance of 0.8 inches. A sample prepared similarly with latex containing 60 parts styrene and 40 parts butadiene failed the MVSS-302 test, burning more than 10 inches.

EXAMPLE 23

Non-Woven Binder

The latex composition of Example 22 was placed into a tray. A non-woven polyester fiber filter medium weighing about 1.25 oz/yd² was pulled through the latex, assuring complete immersion. Upon drying at 300° F. for one minute, the filter media was weighed and found to have a dry pick up of 88%.

A second sample of latex was prepared substituting 30 parts styrene for dibromostyrene. The dry pick up was 81%. Both filter media samples were tested for flammability by exposure to a 4 in. high, 1950° F. propane flame from a Fisher Burner. The filter medium was held 2½ in. over the top of the burner at a 15° angle from horizontal.

The filter medium which was not bound with latex containing brominated styrene ignited and burned until it was extinguished with a water jet. The extent of burn was greater than 12 inches. The filter medium bound with latex containing brominated styrene burned approximately 7 in. from the burner flame and self-extinguished, demonstrating superior flammability resistance.

EXAMPLE 24

Preparation and Testing of Latex for Carpet Backing

Precoat compounds were applied to carpet direct from a tufting machine. The carpet consisted of 100% nylon face fibers having a weight of 29 oz/yd².

The following procedure was used to prepare the latex emulsion: 105.7 parts (by weight) deionized water, 3.5 parts sodium dodecyl sulfate, 0.3 parts potassium persulfate, and 0.3 parts sodium bisulfite were added to a quart bottle. After stirring, 57 parts styrene and 4 parts methacrylic acid were added. Finally, 39 parts butadiene was charged quickly. The bottle was capped and rotated about a horizontal axis in a 50° C. water bath for 15 hours. Conversion was greater than 99%. The latex emulsion was neutralized to pH 7 with ethylenediamine. A second latex was made similarly, substituting 18 parts dibromostyrene for 18 parts styrene. For each 100 parts by weight of solids in the latex emulsions, 0.5 parts sodium hexametaphosphate, 0.5 Dow Corning Antifoam B, 600 partly CaCO₃, and 2.5 parts Rohm & Haas ASE-60 acrylate thickeners were added.

A labcoater was used to obtain an applied weight of 18 ox/yd² on the carpet back once the carpet was oven dried. Table VII below summarizes the results of DOC. fF-1-70 (pill test) flammability tests on several formulations. It can readily be seen that 18 parts of dibromostyrene in the latex confers as much flame retardancy as 200 parts of alumina trihydrate (ATH) flame retardant.

TABLE VII

| COMPONENT | 1 | 2 | 3 |
|---|---|---|---|
| Styrene | 57 | 39 | 57 |
| Butadiene | 39 | 39 | 39 |
| Methacrylic Acid | 4 | 4 | 4 |
| Dibromostyrene | 0 | 18 | 0 |
| CaCO₃ | 600 | 600 | 400 |
| ATH | 0 | 0 | 200 |
| DOC.FF-170 Results | Fail | Pass | Pass |
| Avg. Extent of Burn(in) | 4.0 | 1.2 | 1.35 |

EXAMPLE 25

Latex Adhesive for Secondary Backing

The precoated carpet in Example 24, Number 1 was used as a substrate for a secondary jute backing. This precoating carpet does not meet the flammability criteria of DOC. FF-1-70 (pill test). The two coatings in Table VIII below were applied to the back of the precoated fabric, directly over the precoat at an applied rate of 12 oz/yd². Jute backing, weighing 6-6.5 oz/yd² was then placed over the freshly coated carpet back, the coating acting as an adhesive.

The latex compositions were prepared essentially as in Example 24, the only changes being a modification in polymer ratio and reduction of the CaCO₃ filler level to improve adhesion. Upon drying, the secondary jute backing adhered well to the carpet even after repeated mild flexing.

TABLE VIII

| Formulation | A | B | C |
|---|---|---|---|
| Styrene | 57 | 20 | 0 |
| Butadiene | 39 | 39 | 39 |
| Methacrylic Acid | 4 | 4 | 4 |
| Dibromostyrene | 0 | 37 | 57 |
| CaCO₃ | 300 | 300 | 300 |
| Sodium hexametaphosphate | 0.25 | 0.25 | 0.25 |
| DOC.FF-170 | Fail | Pass | Pass |
| Avg. Burn Extent(in) | 4.0 | 3.2 | 2.3 |

On the basis of the above results, latices containing dibromostyrene can be used in either the precoat or secondary backing adhesive to confer flame retardancy. It should be noted that after exposure to ultraviolet light, the latex C showed little or no discoloration. A darkening was observed for latex B, indicating that aromatic monomers used in conjunction with dibromostyrene may be undesirable in some applications.

While the invention has been described in detail in the foregoing description and its specific Examples, the same is to be considered as illustrative and not restrictive in character. It is to be understood that only the preferred embodiments have been described, and that all changes and modifications that come within the spirit of the invention are desired to be protected.

What is claimed is:

1. In a composite material comprising a substrate and a latex coating adhered thereto, the improvement comprising the coating being a thermally and hydrolytically stable flame retardant latex material comprising:

about 95 to about 5 weight percent of units from ring-brominated, ethylenically unsaturated aromatic monomer, said monomer including greater than about 1 and up to about 4 bromines per unit; and about 5 to about 95 weight percent of units from aliphatic conjugated diene monomer having from 4 to 10 carbon atoms, said latex material having a molecular weight of at least about 25,000.

2. The improvement of claim 1 in which bromine comprises from about 10 to about 60 weight percent based on the weight of the coating.

3. The improvement of claim 1 in which the coating comprises about 88 to about 25 weight percent of units from said aromatic monomer and about 12 to about 75 weight percent of units from said diene.

4. The improvement of claim 1 in which said aromatic monomer is selected from the group consisting of di-, tri- and tetrabromo- forms of styrene, methylstyrene, α-methylstyrene, α-methyl methylstyrene, ethylstyrene, α-methyl ethylstyrene and mixtures thereof with each other and with monobromostyrene.

5. The improvement of claim 4 in which said aromatic monomer is dibromostyrene.

6. The improvement of claim 1 in which said diene is selected from the group consisting of 1,3-butadiene, chloroprene, isoprene, 2,3-dimethyl-1,3-butadiene, piperylene.

7. The improvement of claim 6 in which said diene is butadiene.

8. The improvement of claim 1 and which has a molecular weight of at least about 100,000.

9. The improvement of claim 1 and which is free of terminal —OH groups.

10. The improvement of claim 1 and which is substantially free of carboxylic acid and derivatives thereof.

11. The improvement of claim 1 and which consists essentially of about 88 to about 25 weight percent of units from said aromatic monomer and about 12 to about 75 weight percent of units from said diene.

12. The improvement of claim 11 and which has a molecular weight of at least about 100,000.

13. In a composite material comprising a substrate and a latex coating adhered thereto, the improvement comprising the coating being a thermally and hydrolytically stable flame retardant latex material comprising:

about 90 to about 5 weight percent of units from ring-brominated, ethylenically unsaturated aromatic monomer, said monomer including greater than about 1 and up to about 4 bromines per units;

about 5 to about 90 weight percent of units from halogen-free aromatic monomer; and about 90 to about 5 weight percent of units from aliphatic conjugated diene having from 4 to 10 carbon atoms, said latex material having a molecular weight of at least about 25,000.

14. The improvement of claim 13 in which bromine comprises from about 10 to about 60 weight percent based on the weight of the coating.

15. The improvement of claim 13 in which the coating comprises about 40 to about 20 weight percent of units from said aromatic monomer, about 10 to about 68 weight percent of units from said halogen-free aromatic monomer, and about 50 to about 12 weight percent of units from said diene.

16. The improvement of claim 13 in which said aromatic monomer is selected from the group consisting of di-, tri- and tetrabromo- forms of styrene, methylstyrene, α-methylstyrene, α-methyl methylstyrene, ethylstyrene, α-methyl ethylstyrene and mixtures thereof with each other and with monobromostyrene.

17. The improvement of claim 16 in which said aromatic monomer is dibromostyrene.

18. The improvement of claim 13 in which said diene is selected from the group consisting of 1,3-butadiene, chloroprene, isoprene, 2,3-dimethyl-1,3-butadiene, piperylene.

19. The improvement of claim 18 in which said diene is butadiene.

20. The improvement of claim 19 in which said aromatic monomer is dibromostyrene and in which said halogen-free aromatic monomer is styrene.

21. The improvement of claim 13 and which has a molecular weight of at least about 100,000.

22. The improvement of claim 13 and which does not have terminal —OH groups.

23. The improvement of claim 13 and which is substantially free of carboxylic acid and derivatives thereof.

24. The improvement of claim 13 in which the coating consists essentially of about 40 to about 20 weight percent of units from said aromatic monomer, about 10 to about 68 weight percent of units from said halogen-free aromatic monomer, and about 50 to about 12 weight percent of units from said diene.

25. The improvement of claim 24 and which has a molecular weight of at least about 100,000.

26. A composite material comprising:
a. a substrate adapted to be coated; and
b. a coating adhered to said substrate, said coating comprising a thermally and hydrolytically stable flame retardant latex material selected from the group consisting of:
i. a latex comprising about 95 to about 5 weight percent of units from ring-brominated, ethylenically unsaturated aromatic monomer, said monomer including greater than about 1 and up to about 4 bromines per unit, and about 5 to about 95 weight percent of units from aliphatic conjugated diene monomer having from 4 to 10 carbon atoms, and
ii. a latex comprising about 90 to about 5 weight percent of units from ring-brominated, ethylenically unsaturated aromatic monomer, said monomer including greater than about 1 and up to about 4 bromines per unit, about 5 to about 90 weight percent of units from halogen-free aromatic monomer, and about 90 to about 5 weight percent of units from aliphatic conjugated diene having from 4 to 10 carbon atoms, said latex material having a molecular weight of at least about 25,000.

27. An improved method for preparing a composite material including a substrate and a latex coating adhered thereto, the method comprising adhering to the substrate a thermally and hydrolytically stable flame retardant latex material selected from the group consisting of:
a. a latex comprising about 95 to about 5 weight percent of units from ring-brominated, ethylenically unsaturated aromatic monomer, said monomer including greater than about 1 and up to about 4 bromines per unit, and about 5 to about 95 weight percent of units from aliphatic conjugated diene monomer having from 4 to 10 carbon atoms, and b. a latex comprising about 90 to about 5 weight percent of units from ring-brominated, ethylenically unsaturated aromatic monomer, said monomer including greater than about 1 and up to about 4 bromines per unit, about 5 to about 90 weight percent of units from halogen-free aromatic monomer, and about 90 to about 5 weight percent of units from aliphatic conjugated diene having from 4 to 10 carbon atoms, said latex material having a molecular weight of at least about 25,000.

* * * * *

UNITED STATES PATENT AND TRADEMARK OFFICE
CERTIFICATE OF CORRECTION

PATENT NO. : 5,100,986

DATED : March 31, 1992

INVENTOR(S) : Nicolai A. Favstritsky, Jin-liang Wang, Richard S. Rose

It is certified that error appears in the above-identified patent and that said Letters Patent is hereby corrected as shown below:

In Column 9, line 45 change "ox" to --oz--.

In Column 12, line 6 change "ox/yd$^2$" to --oz/yd$^2$--.

In Column 12, line 8 change "fF-1-70" to --FF-1-70--.

In Column 15, line 5 change "from4" to --from 4--.

Signed and Sealed this

Thirty-first Day of August, 1993

Attest:

BRUCE LEHMAN

*Attesting Officer*  *Commissioner of Patents and Trademarks*